May 2, 1933.    T. MUNRO    1,906,401
SPRING HANGER COVER
Filed July 5, 1929
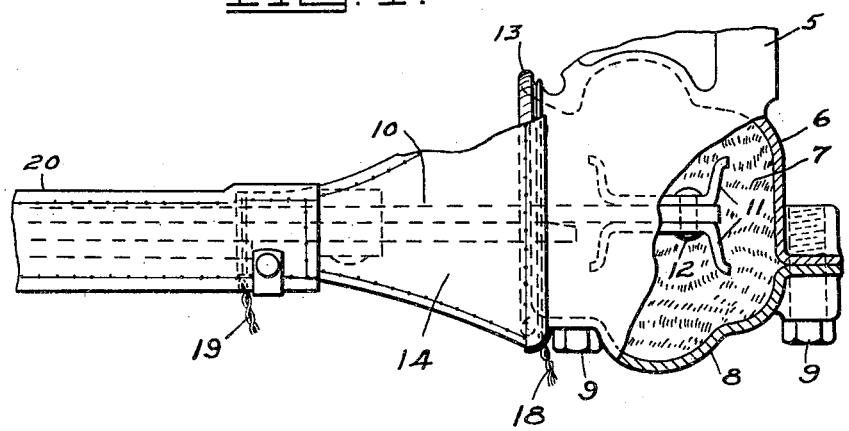
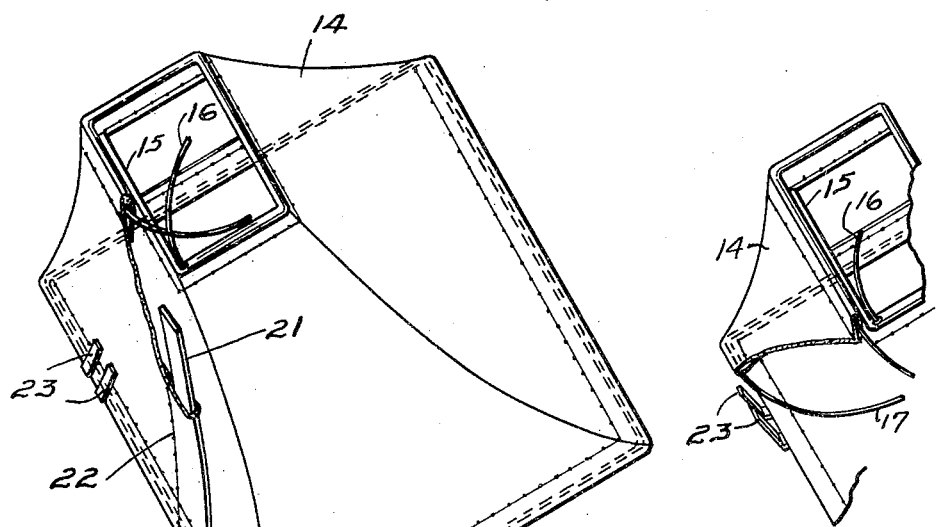
INVENTOR
Thomas Munro.
BY
Harness, Dickey & Pierce
ATTORNEY Patented May 2, 1933

1,906,401

UNITED STATES PATENT OFFICE

THOMAS MUNRO, OF PHILADELPHIA, PENNSYLVANIA

SPRING HANGER COVER

Application filed July 5, 1929. Serial No. 376,063.

This invention relates to spring covers and is an improvement on the construction shown and described in my United States Patent No. 1,596,290 of August 17, 1926, and in my application for Letters Patent of the United States for improvements in Spring hanger cover filed January 30, 1928 and serially numbered 250,392, the principal object being to provided certain novel features in connection with such covers whereby a more satisfactory product results.

Another object is to provide a spring hanger cover in which fastening elements are secured within the cover.

Another object is to provide a spring hanger cover including stiffening means for maintaining the shape thereof.

Another object is to provide a spring hanger cover formed of flexible material and including an overlapping flap, means being provided for maintaining the position of the flap relative to the ends of the cover.

A further object is to provide a spring hanger cover that will be simple in design, economical to manufacture, and which includes novel structural features designed to maintain the cover in proper relation with respect to the co-operating spring.

The above being among the objects of the present invention, same consists in certain novel features of construction and combinations of parts to be hereinafter described with reference to the accompanying drawing, and then claimed, having the above and other objects in view.

In the accompanying drawing, which illustrates one suitable embodiment of the present invention, and in which like numerals refer to like parts throughout the several different views, Fig. 1 is a fragmentary side view of an automobile spring shown attached to a vehicle frame and including a spring hanger cover constructed in accordance with the present invention.

Fig. 2 is an enlarged partially broken perspective view of a spring hanger cover.

Fig. 3 is a fragmentary perspective view of the cover to better illustrate the means for maintaining the flap against displacement relative to an end of the cover.

In the drawing I show a motor vehicle frame end member 5 having a housing 6 formed at one end thereof, within which is received a rubber block 7 which is held under compression by clamping the bottom half 8 of the housing in place through studs 9. A multiple leaf spring 10 projects through the open side of the housing and is provided with stampings such as 11 secured to one end thereof by any suitable means such as rivets 12, the spring 10 being secured relative to the rubber block 7 by engagement of the stampings 11 therewith. The open side of the chamber 6 is provided with an outturned beaded edge 13. The cover which forms the subject of the present invention and which is indicated generally at 14 in the drawings is adapted to close the open end of the chamber 6 so as to prevent grease, dirt, or other foreign matter from finding its way into contact with the rubber block 7.

As illustrated in the drawing, the cover is formed of a lubricant impervious, flexible material such as suitably treated fabric to a shape which somewhat resembles a truncated pyramid. This cover may be formed as a single piece to completely surround the top, bottom and sides of the spring, a flap such as 15 being provided at one of the free sides so as to overlap or be overlapped by the other free edge and thereby form a more perfect seal at this point. Each end of the cover may be secured by a flexible attachment means including a readily bendable wire such as 16 and 17 respectively, the wires 16 and 17 being shown as secured within the cover by sewing the wire within the reversely bent end margins thereof, the wires extending through the cover proper but not through the flap 15, the ends of each wire being exposed favorably to an intertwisting thereof.

In operation this cover may be applied to the spring and the spring hanger in a similar manner to that described in my previous applications above referred to, that is, the large end of the cover is extended around the flange 13 of the housing and is secured thereto by drawing the free ends of the wire 17 together and twisting them as indicated at 18 in Fig. 1 so as to lock the large end against displacement. The small end of the cover may seat directly upon the spring 10 when the free ends of the wire 16, if used, are drawn together and twisted as indicated at 19 of Fig. 1.

A spring cover 20 for the body of the spring 10 may be provided if desired, and when so provided is preferably extended over the small end of the cover 14 in overlapping relationship thereto, as also indicated in Fig. 1. The small end of the cover 14 is preferably so placed within the cover 20 in order to forestall possibility of any grease or other lubricant held in the cover 20 from readily working along the spring to within the cover 14 and thence to the rubber block 7.

In the construction illustrated in my pending United States application above referred to, no means were provided for maintaining the ends of the cover from movement relative to each other, and subsequently I have discovered that due to the working of the spring there is a tendency for the small end of the cover to creep along the spring towards the large end of the cover and that this sometimes detracts from the full purpose of the cover. Accordingly, in accordance with the present invention, I provide means for maintaining the ends of the cover 14 from relative movement with respect to each other along the spring. As best indicated in Fig. 2, this means may comprise a rigid strip 21 formed of metal, fiber or some other like material of substantial stiffness, which I secure within the free edge of the cover 14 as by reversely bending the margin of the cover over the member 21 and sewing the reversely bent margin as at 22, to form a hem which provides a splint-receiving pocket. The member 21 preferably extends from one end of the cover to the opposite end thereof and thus acts as a splint to maintain such ends in a definite spaced relationship, flat surfaces of said splint remaining approximately parallel to corresponding surfaces of the spring during flexure thereof.

I have also found that the flap 15, unless otherwise held, has a tendency to shift out of its proper position and the large end thereof to move towards the small end of the cover, and accordingly I have provided means whereby such shifting of the flap is prevented. In the form illustrated in Figs. 2 and 3, this means comprises one or more fingers 23, which are sewn into or otherwise secured to the end of the flap 15 at the large end of the cover 14, and which are positioned adjacent the free edge of the flap 15. These fingers are preferably formed of readily bendable metal. In operation these fingers are extended over the outside of the cover 14 and bent down against the surface of the cover over the wire 17, or its equivalent, thus acting as catches for maintaining the longer end of the flap 15 in parallel relationship with the corresponding end of the cover 14.

It will be apparent that with this construction the wires 16 and 17 are built into the cover 14 and form a ready and easy means for securing the cover in place. It will also be apparent that the member 21 or additional members of a like nature which may be employed if desired will act to keep the cover from collapsing in an endwise direction, and that the fingers 23 will prevent displacement of the flap 15 so that the proper seal for the cover will be maintained at all times.

Formal changes may be made in the specific embodiment of the invention described without departing from the spirit and substance of the broad invention, the scope of which is commensurate with the appended claims.

What I claim is:

1. The combination with a spring hanger housing open on one side, a rubber block enclosed by said housing, and a spring having an end projecting through said opening and received in said block, of a cover for sealing the open end of said housing comprising a split flexible housing embracing said housing at one end and said spring at the opposite end, a flap secured to one of the side edges of said cover and overlapping the other side edge of said cover, and readily bendable wires secured in the end margins of said cover exclusive of said flap.

2. The combination with a spring hanger housing open on one side, a rubber block enclosed by said housing, and a spring having an end projecting through said opening and received in said block, of a cover for sealing the open end of said housing, comprising a split flexible member embracing said housing at one end and said spring at the other end, a longitudinal stiffening member secured to the split flexible member and readily bendable wire portions secured in the end margins of said cover for securing the cover in position.

3. The combination with a spring hanger housing open on one side, a rubber block enclosed by said housing, and a spring having an end projecting through said opening and received in said block, of a cover for sealing the open end of said housing comprising a split flexible member embracing said housing at one end and said spring at the opposite end, a flap secured to one of the side edges of said cover and overlapping the other side edge of said cover, a longitudinal stiffening member secured to said flexible member, said stiffening member extending from end to end of the cover and readily bendable wires secured in the end margins of said cover exclusive of said flap for securing the cover in position.

THOMAS MUNRO.